United States Patent Office 2,798,098
Patented July 2, 1957

2,798,098
CONDENSATION OF HYDROCARBONS WITH CARBOHYDRATES AND RELATED MATERIALS

Carl B. Linn, Riverside, Ill., assignor to Universal Oil Products Company, Des Plaines, Ill., a corporation of Delaware No Drawing. Application June 10, 1953, Serial No. 360,838

13 Claims. (Cl. 260—618)

This application is a continuation-in-part of my copending application, Serial No. 212,839, filed February 26, 1951, now abandoned.

This invention relates to a process for interacting hydrocarbons with carbohydrates and materials closely related to carbohydrates. The process relates more particularly to the condensation of simple sugars, their desoxy, and omega-carboxy derivatives, compound sugars or oligosaccharides, and polysaccharides, with hydrocarbons in the presence of a hydrogen fluoride catalyst.

An object of this invention is to produce organic materials suitable per se or as intermediates in the manufacture of detergents, pharmaceuticals, explosives, gelling agents, surface coatings, resins, and oxidation inhibitors by condensing hydrocarbons with carbohydrates or with carbohydrate derivatives.

One embodiment of this invention relates to a process which comprises condensing a hydrocarbon with a carbohydrate in the presence of a hydrogen fluoride catalyst, and recovering the resultant condensation products.

Another embodiment of this invention relates to a process which comprises condensing an isoparaffinic hydrocarbon with a carbohydrate in the presence of a hydrogen fluoride catalyst, and recovering the resultant condensation products.

Still another embodiment of this invention relates to a process which comprises condensing an olefinic hydrocarbon with a carbohydrate in the presence of a hydrogen fluoride catalyst, and recovering the resultant condensation products.

Still another embodiment of this invention relates to a process which comprises condensing an aromatic hydrocarbon with a carbohydrate in the presence of a hydrogen fluoride catalyst, and recovering the resultant condensation products.

A still further embodiment of this invention relates to a process which comprises condensing a naphthenic hydrocarbon with a carbohydrate in the presence of a hydrogen fluoride catalyst, and recovering the resultant condensation products.

I have found that useful water insoluble condensation products and also water soluble condensation products are formed by reacting hydrocarbons with carbohydrates and related substances in the presence of a hydrogen fluoride catalyst. These reactions may be carried out in steel equipment or other suitable apparatus lined with silver, copper, and certain alloys such as Monel metal and the like. This treatment may be effected at temperatures of from about —40° to about 100° C., and preferably at temperatures of from about —10 to about +50° C. The pressure at which the reaction is carried out will vary with the reaction temperature used, the mol fractions of reactants and hydrogen fluoride catalyst present, and the volume of the particular reactor utilized. While many of the condensation reactions are carried out at substantially atmospheric pressure, it may be desirable in certain instances and with certain reactants to carry out the reaction at pressures up to 100 atmospheres or more. It is convenient in most instances to operate the equipment utilized at the pressure generated by the reaction mixture and the catalyst contained therein.

Hydrocarbons which may be used as starting materials in the process of this invention include isoalkanes or isoparaffinic hydrocarbons, alkenes or olefinic hydrocarbons, alkynes or acetylenic hydrocarbons, alkadienes, aromatic hydrocarbons, hydrocarbons with condensed benzene rings, cyclanes or cycloparaffinic hydrocarbons, and terpenes.

Typical utilizable alkanes include isobutane, 2-methylbutane, 2,3-dimethylpropane, 2-methylpentane, 3-methylpentane, 2,3-dimethylbutane, 2-methylhexane, 3-methylhexane, 2,3-dimethylpentane, 2,4-dimethylpentane, 2,2,3-trimethylbutane, 2-methylheptane, 3-methylheptane, 4-methylheptane, 2,3-dimethylhexane, 2,4-dimethylhexane, 2,5-dimethylhexane, 2,2,3-trimethylpentane, 2,2,4-trimethylpentane, 2,3,3-trimethylpentane, isononanes, isodecanes, isoundecanes, isododecanes, etc.

Suitable utilizable alkene hydrocarbons include ethylene, propylene, 1-butene, 2-butene, isobutylene, pentenes, hexenes, heptenes, octenes, nonenes, decenes, undecenes, dodecenes, etc. High molecular weight polyolefinic hydrocarbons such as those recovered from hydrogen fluoride catalysts used to catalyze the polymerization of olefins, or to catalyze the alkylation of isoparaffinic hydrocarbons with olefins, are also utilizable in the process of the present invention.

Utilizable alkyne hydrocarbons include acetylene, methylacetylene, ethylacetylene, propylacetylene, butylacetylene, etc., dimethylacetylene, methylethylacetylene, diethylacetylene, ethylpropylacetylene, etc. These acetylenic hydrocarbons may also contain aryl and alkaryl substituents such as phenylacetylene, tolylacetylene, etc.

Suitable utilizable alkadiene hydrocarbons include propadiene or allene, derivatives of allene, butadiene, 2-methylbutadiene or isoprene, etc.

Suitable utilizable aromatic hydrocarbons include benzene, toluene, o-xylene, m-xylene, p-xylene, ethylbenzene, 1,2,3-trimethylbenzene, 1,2,4-trimethylbenzene, 1,3,5-trimethylbenzene or mesitylene, ortho-ethyltoluene, meta-ethyltoluene, p-ethyltoluene, n-propylbenzene, isopropylbenzene or cumene, etc. Higher molecular weight alkyl-aromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which case the alkyl group attached to the aromatic hydrocarbon varies in size from $C_9$ to $C_{18}$.

Other suitable utilizable aromatic hydrocarbons include those containing an unsaturated side chain such as styrene, vinyltoluene, etc.

Other suitable utilizable aromatic hydrocarbons include those with two or more aryl groups such as diphenyl, diphenylmethane, triphenylmethane, fluorene, stilbene, etc. Examples of suitable utilizable hydrocarbons which contain condensed benzene rings include naphthalene, anthracene, phenanthrene, naphthacene, rubrene, etc.

Suitable utilizable cycloalkane hydrocarbons include alkylcycloalkanes such as methylcyclopropane, methylcyclobutane, methylcyclopentane, methylcyclohexane, etc., aryl substituted cycloalkanes, such as phenylcyclopentane, phenylcyclohexane, etc. Derivatives of cycloalkanes formed by the loss of one molecule of hydrogen to produce cycloalkenes or cycloalkanes containing an unsaturated side chain are also within the scope of the present invention, as are diolefinic cycloalkanes such as cyclopentadiene, etc.

Suitable utilizable terpenic hydrocarbons include menthane, limonene, thujane, carane, pinane, camphane, sabinene, carene, alpha-pinene, beta-pinene, etc.

Carbohydrates which are condensed with hydrocarbons in the process of the present invention include simple sugars, their desoxy and omega-carboxy derivatives, compound sugars or oligosaccharides, and polysaccharides. Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, i. e., polyuronides, polysaccharides comprised of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde and s-dihydroxyacetone; tetroses, such as erythrose, threose, erythrulose, and apiose; the pentoses such as arabinose, xylose, ribose, lyxose, rhamnose (a desoxyhexose), fucose (a desoxyhexose), rhodeose, digitalose, and ketoxylose; the hexoses, such as mannose, glucose, idose, gulose, gallactose, talose, allose, altrose, fructose, sorbose, tagatose, and psicose; heptoses such as glucoheptose, mannoheptose, galactohextose, sedoheptose, mannoketoheptose, glucoheptulose, and perseulose; octoses such as glucooctose, mannooctose, and gallactooctose; nonoses such as gluconcnose, and mannononose; and decoses such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxypyruvic acid, α,γ-dihydroxyacetoacetic acid, threuronic acid, 4-keto-2,3,5-trihydroxypentanoic acid, xyluronic acid, 5-keto-hexanoic acids such as 5-keto-allonic acid, 5-keto-gluconic acid, 5-ketomannonic acid, 5-ketogulonic acid, and 5-keto-gallactonic acid, uronic acids such as glucouronic acid, mannuronic acid and gallacturonic acid, and the 6-ketoheptanoic acids. The simple sugars and their omega-carboxy derivatives, as starting materials for the process of this invention, may be represented by the following general formula:

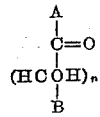

in which A=H and CH₂OH, n= an integer from 1 to about 12 or so, and B=H, CH₂OH, and COOH. As an example of the utility of this general formula when A=H, n=1, and B=H, the compound is glycolaldehyde; when A=H, n=1, and B=CH₂OH, the compound is glyceraldehyde; when A=H, n=1, and B=COOH, the compound is tartaronic semialdehyde, a tautomer of hydroxypyruvic acid; when A=CH₂OH, n=1, and B=H, the compound is s-dihydroxyacetone; when A=CH₂OH, n=1, and B=CH₂OH, the compound is erythrulose; when A=CH₂OH, n=1, and B=COOH, the compound is α,γ-dihydroxyacetoacetic acid; when A=H, n=2, and B=CH₂OH, the compound is erythrose, or threose; when A=H, n=2, and B=COOH, the compound is threuronic acid; when A=CH₂OH, n=2, and B=CH₂OH, the compound is riboketose, or xyloketose; when A=CH₂OH, n=2, and B=COOH, the compound is 4-keto-2,3,5-trihydroxypentanoic acid; when A=H, n=3, and B=CH₂OH, the compound is ribose, arabinose, xylose, or lyxose; when A=H, n=3, and B=COOH, the compound is xyluronic acid; when A=CH₂OH, n=3, and B=CH₂OH, the compound is psicose, fructose, sorbose, or tagatose; when A=CH₂OH, n=3, and B=COOH, the compound is 5-ketohexanoic acid; when A=H, n=4, and B=CH₂OH, the compound is allose, altrose, glucose, mannose, gulose, idose, gallactose, or talose; when A=H, n=4, and B=COOH, the compound is a uronic acid; when A=CH₂OH, n=4, and B=CH₂OH, the compounds are heptoses; and when A=CH₂OH, n=4, and B=COOH, the compounds are 6-ketoheptanoic acids.

The utilizable oligosaccharides or compound sugars include disaccharides such as the pentose-hexose saccharides including glucoapiose, vicianose, and primeverose; the methylpentose-hexose saccharides including glycorhamnoside, and rutinose; and the dihexoses such as turanose, maltose, lactose, cellobiose, gentiobiose, meliboise, sucrose, and trehalose. Other compound sugars are represented by trisaccharides such as the methylpentose-hexose saccharides including rhamninose, and robinose; the trihexose saccharides such as mannotriose; and the trihexoses including raffinose, melezitose, and gentianose. An example of a suitable tetrasaccharide is stachyose.

Various polysaccharides are also utilizable in the process of the present invention. These polysaccharides include pentosans such as araban, methylpentosans such as fugosan, the hexosans, such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, pectins, and those containing hexose units esterified with an inorganic acid such as certain seaweed polysaccharides like agar.

The hydrogen fluoride catalyst which is used in this process may be used in anhydrous form or diluted with water to make a hydrofluoric acid of the desired concentration. The hydrofluoric acid may also be further diluted with various inert diluents when it is desirable to operate the process of this invention with low hydrogen fluoride concentrations. Suitable inert diluents include normal paraffinic hydrocarbons such as propane, n-butane, n-pentane, n-hexane, etc., and perfluoro derivatives of n-paraffinic hydrocarbons such as perfluoropropane, perfluoro-n-butane, perfluoro-n-pentane, perfluoro-n-hexane, etc. Other suitable diluents in these classes are apparent to one skilled in the art. For example, cycloparaffins as cyclopentane and cyclohexane may be used. In some instances, hydrofluoric acid of from about 85 to about 100% HF concentration is desirable, and in some other instances it is most desirable to use anhydrous hydrogen fluoride as the catalyst.

This process may be carried out by slowly adding a hydrogen fluoride catalyst to a stirred mixture of the hydrocarbon and carbohydrate or related material being subjected to reaction while maintaining the reaction temperature at from about −40° to about 100° C. By suitable cooling and/or heating means it is often advisable or desirable to commingle the reactants and catalyst at a relatively low temperature such as from about −80° to about −30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride catalyst is removed from the reaction mixture by distillation at atmospheric or lower pressures or by passing an inert gas through the reaction mixture while maintaining it at relatively low temperature. Also the entire reaction mixture and catalyst may be mixed with water or may be added to ice in order to quench the activity of the hydrogen fluoride catalyst and permit separation of the organic reaction products and unreacted starting materials from the catalyst. The organic reaction products may also be separated from aqueous hydrogen fluoride by means of an organic solvent such as ether in which some of the organic material may be dissolved. Further methods of isolating the reaction products are illustrated in the examples. Thus the product formed by reacting toluene with glucose or cellulose in the presence of substantially anhydrous hydrogen fluoride at 30° C. is separated into an ether soluble and water insoluble product and an ether insoluble and water-soluble product.

The process of this invention broadly emphasizes the reaction of carbohydrates including simple sugars, their derivatives, compound sugars, and polysaccharides with hydrocarbons such as isoparaffins, olefins, aromatics, naphthenes, and terpenes using as a catalyst, hydrogen fluoride.

The type of product is markedly affected by the length of time that the reactants are in contact with the hydrogen fluoride catalyst as well as the temperature of reaction. This time factor will be set forth more fully hereinafter in the examples.

The reaction products of this process lead to materials having diversified uses. Some of these are enumerated as follows:

(a) *Detergents.*—
(1) *Sulfonate type.*—Sulfonation of some of the products lead to compounds of the R—SO$_3$H type which can be converted into surface active salts.
(2) *Sulfate type.*—Sulfation of these products lead to compounds of the ROSO$_3$H type which, if desired, can be converted into salts.
(3) *Nonionic type.*—The monohydrocarbon substituted products are water soluble to different degrees depending upon the size and nature of the hydrocarbon substituent. Thus, for example, it is possible to make a series of surface-active agents with increasing hydrophobic-hydrophilic ratio in the molecule by reacting glucose with monoalkylbenzenes, in which the alkyl group varies from $C_1$ to $C_{20}$.
(4) *Detergent aids.*—The structure of some of the products are related to compounds found useful as detergent aids (that is, compounds which when added to a detergent in small concentrations rather markedly increase their effectiveness). They may accordingly find use in that field.

(b) *Surface coatings and resins.*—Some of the reaction products can be used per se as surface coating materials. Resins can be made by heating many of the reaction products with formaldehyde, urea, phenol, aniline, etc., and combinations of the above-enumerated compounds.

(c) *Explosives.*—Nitration of many of the reaction products will give explosives. These explosives will contain in some instances nitro groups attached to aromatic rings as well as being nitro-alcohol derivatives.

(d) *Fermentation.*—The conversion of many of the reaction products into other useful chemicals such as plastics, etc. can be accomplished by employing the products as a substratum for growing certain species of bacteria. It has been observed that water concentrations of some of these products support the growth of fungi.

(e) *Pharmaceuticals.*—Since many of the products which can be prepared by the present process are either completely new in constitution, or hitherto unavailable in appreciable amounts and combine the chemistry of carbohydrates on one hand, and of the hydrocarbons on the other hand, they open up a completely new field of substances adaptable for use in medicinal chemistry or in general chemical synthesis.

(f) *Gelling agents.*—Various reaction products are effective for gelling paraffinic or aromatic hydrocarbons. Thus, for example, small quantities of one of the reaction products of toluene and fructose gels benzene, and pentane to a lesser extent.

The nature of this invention is illustrated further by the following examples which, however, should not be misconstrued to limit unduly the generally broad scope of the invention.

EXAMPLE I

This example illustrates the reaction of toluene with cellulose. Cellulose is a polysaccharide containing glucoside linkages, and with all but one of the potential aldehyde groups of the glucose residues involved in these glucoside linkages. This reaction was studied at three temperatures, $-30°$ C., $0°$ C., and $+30°$ C., using a relatively large amount of hydrogen fluoride and a toluene-cellulose mol ratio of greater than 2. At $0°$ C. the reaction was studied further by determining the effect on the reaction of reducing the amount of hydrogen fluoride catalyst. The type of product obtained by using approximately equal mols of toluene in cellulose in the reaction at $0°$ C. was also studied. The conditions for the reaction and quantities of materials used in each, are summarized in the following table:

Table 1.—*Reaction of cellulose with toluene in the presence of hydrogen fluoride*

| Run No. | 1 | 2 | 3 | 4 | 5 | 6 | 7 | 8 | 9 | 10 |
|---|---|---|---|---|---|---|---|---|---|---|
| Conditions of Reaction: | | | | | | | | | | |
| Temp., °C | −30 | −30 | 0 | 0 | 0 | 0 | 0 | 0 | +30 | +30 |
| Contact Time, Hrs | 3 | 5 | 3 | 2 | 2 | 5 | 5 | 5 | 18 | 4 |
| Reactants: | | | | | | | | | | |
| Cellulose, gms | 81 | 41 | 41 | 41 | 41 | 41 | 42 | 63 | 81 | 81 |
| Toluene, gms | 130 | 130 | 130 | 217 | 260 | 217 | 21 | 33 | 130 | 130 |
| Hydrogen fluoride, gms | 204 | 222 | 236 | 114 | 41 | 111 | 221 | 219 | 218 | 188 |
| n-Pentane | 0 | 0 | 0 | 0 | 0 | 0 | 62 | 0 | 0 | 0 |
| Mol Ratio, toluene/cellulose [1] | 2.82 | 5.73 | 5.73 | 9.43 | 11.32 | 9.43 | 0.88 | 0.92 | 2.82 | 2.82 |

[1] Calculated as $C_6H_{10}O_5$, molecular weight 162.

The above experiments were all conducted in substantially the same manner except for minor changes in recovery techniques.

As an example of the manner of conducting these experiments, the following detailed description of run 10 is given: Into a 1 liter steel turbomixer autoclave was sealed 81 grams of cellulose and 130 grams of toluene. With stirring, the autoclave was cooled to $-50°$ C. and 188 grams of hydrogen fluoride added. The temperature was allowed to rise to 30° C. during two hours and the stirring continued for an additional 2 hours at 30–35° C. Then a stream of nitrogen was passed through the reactor at atmospheric temperature for 16 hours; 13 cubic feet of nitrogen were used. The hydrogen fluoride and toluene volatilized were condensed at $-78°$ C., their recovery being: hydrogen fluoride, 135 grams; and toluene, 36 grams. A substantial amount of hydrogen fluoride remained behind in the reaction mixture although most of it could have been recovered by prolonging the nitrogen purge. The autoclave was opened and the product found to be a heavy fuming liquid. Water was added to extract the remaining hydrogen fluoride. This aqueous part was neutralized with magnesium oxide and concentrated to yield a water-soluble product. The water-soluble part was dissolved in benzene, the benzene solution filtered, and the benzene removed by evaporation. This product was a brown solid and weighed 146 grams. It was separated into an ether soluble and ether insoluble portion. The ether soluble part was soluble in benzene and acetone but insoluble in water. The ether insoluble part was soluble in acetone, and in hot water from which it could be recrystallized.

Several conclusions have been drawn from the reactions as outlined in the above Table I. There was no indication that toluene reacted with cellulose in the presence of hydrogen fluoride at −30° C. The two low temperature experiments, runs 1 and 2, were similar except for the time of contacting. The results obtained indicated that the cellulose slowly lost its form and became an insoluble gray powder, the carbon-hydrogen content of which approximated cellulose. This gray powder may represent a shorter polymer system than the initial cellulose. Thus treatment of polysaccharides alone with a hydrogen fluoride catalyst results in interesting new compositions. An elementary analysis of the gray powder is: percent carbon, calculated for $C_6H_{10}O_5$, 44.4%; found, 41.66%; percent hydrogen calculated for $C_6H_{10}O_5$, 6.2%; found, 6.52%. Thus −30° C. is too low a temperature to involve toluene in reaction with cellulose although cellulose itself is changed.

Runs 3, 4, 5, 6, 7, and 8 were conducted at 0° C. It was established that there is a critical amount of hydrogen fluoride catalyst necessary to cause reaction and that below that amount (which was not accurately established) there is no involvement of toluene in the reaction with cellulose (run 5). In run 5, after the autoclave was opened the toluene layer was decanted off and evaporated to dryness leaving a residue of only 0.3 gram. After the residual hydrogen fluoride was removed from the residue over steam, 41 grams of product was obtained. Of this 41 grams, 8 grams was soluble in hot water and the solution contained a reducing sugar as indicated by a Fehling's solution test. The insoluble residue was assumed to be cellulose or partially hydrolyzed molecules thereof.

Where the requisite amount of hydrogen fluoride is present, cellulose reacts with a molar excess of toluene at 0° C. in a reaction which probably goes via several different paths. In run 3, 41 grams of cellulose gave more than 33 grams of a pure material which was shown to be 1,1-di-p-tolyl-1-desoxy-D-glucitol, the structural formula of which may be represented as follows:

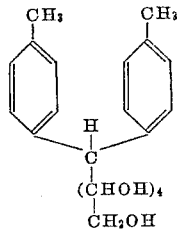

In run 3, after the reactants had been contacted for three hours at 0° C., the autoclave was again cooled to −50° C. and the pot removed. Several hundred grams of ice, precooled to −78° C. were then added to the pot and the contents of the reactor were finally diluted to about 1,000 ml. with water. This material was rapidly poured through a funnel and the solid material separated. This solid material after several crystallizations from alcohol had a melting point of 160–161° C., is soluble to the extent of about 1% in water at 100° C., about 1.5% in ethanol at 25° C., and can be recrystallized from benzene. The presence of 5 hydroxyl groups in the compound was shown by the formation of its pentaacetate derivative. The elementary analysis of the petaacetate derivative corresponded very closely to that calculated for $C_{30}H_{36}O_{10}$. The compound was also oxidized by chromic acid to 4,4'-di-carboxybenzophenone, the dimethyl ester of which was identified by its melting point of 224° C. The observed yield of 1,1-di-p-tolyl-1-desoxy-D-glucitol can undoubtedly be markedly increased by a more refined method of working up the remainder of the product. It is noteworthy that so much pure compound survives in the strong hydrogen fluoride environment. This same product was isolated in run 4, and run 6.

From the structure of the 1,1-di-p-tolyl-1-desoxy-D-glucitol, it can be seen that its formation required two mols of toluene for each glucose unit in the cellulose. Experiments were carried out (runs 7 and 8) to determine the product resulting from reacting approximately equal molecular amounts of toluene and cellulose, based on the glucose units in cellulose. It was expected that a mono-tolylglucitol would result. When the experiments were made, the product was very water soluble in contrast to the moderately water soluble ditolylglucitol. All attempts to isolate a pure product failed; the product, however, did not reduce Fehling's solution and the absence of any glucose was thus proven. When a water solution of the product was concentrated to a syrup, small crystals appeared, but the attempts to isolate them were not successful.

Experiments were also conducted at 30° C., runs 9 and 10 and the data available, although incomplete, gives an indication of the type of reaction which occurs. The 30° reaction product from these runs consists of two parts, an ether soluble-water insoluble part and an ether insoluble-water soluble part. The ether soluble-part insoluble part is a light brown material which gives a resinous surface when plated out from a benzene solution. A portion of this ether soluble-water insoluble part was sulfonated by cold concentrated sulfuric acid to give a water soluble material with surface-active properties. The water soluble part of the product imparted a marked tendency of foaming to its solutions. A pure compound melting at 214–216° C. was isolated. This compound is somewhat soluble in hot water, but when the water solutions were cooled they gelled. The completely dried substance was very hygroscopic. Its elementary analysis indicated exactly the empirical formula $C_{13}H_{18}O_5$.

EXAMPLE II

The condensation products of carbohydrates and hydrocarbons as shown in Example I, cellulose and toluene, constitute a new source for certain polyhydroxy compounds. One use of such compounds is to esterify them with nitric acids to give nitrates similar to nitrocellulose. Pure 1,1-di-p-tolyl-1-desoxy-D-glucitol from the reaction of toluene with cellulose at 0° C. was available and accurately served as a convenient intermediate on which to work. The experimental procedure followed in the nitration was exactly the same as that given for the preparation of pyrocellulose in the chemical literature. Equal volumes of 96% sulfuric acid and 70% nitric acid were mixed together. 75 ml. of this nitrating mixture was poured into a breaker containing 2.5 grams of 1,1-di-p-tolyl-1-desoxy-D-glucitol produced in run 3, Example I. Immediate reaction evolved heat and nitric oxide fumes. The mixture was stirred occasionally over a period of 30 minutes after which time the syrupy red product was transferred to cold water wherein it changed to a yellow solid. The solid was filtered off and purified subsequently by boiling with 200 ml. portions of water. After four such treatments, the filtrate water showed no residual acidity. Two grams of the yellow product were formed. This product begin melting at 90° C. and started decomposing at 175° C. It contained 11.23% nitrogen which corresponds to an introduction of between four and five nitro groups per molecule of starting material. The product burns very rapidly with a smoky flame when ignited.

EXAMPLE III

In Example I, all of the experiments were conducted with cellulose as a reactant and some of the products formed were characterized by the presence of a glucose unit in their structure. To demonstrate the probable interchangeability of cellulose and glucose, an experiment similar to Example I, run 3, was made with glucose. The procedure utilized was similar to that described in Experiment I.

In a one liter nickel-lined steel turbomixer autoclave was sealed 45 grams of glucose and 69 grams of toluene. After sealing, the autoclave was cooled to about −50° C., and 211 grams of hydrogen fluoride was added. The autoclave was maintained at 0° C. for three hours with stirring and then the contacting continued for an additional two hours while a stream of nitrogen was passed therethrough in order to volatilize most of the hydrogen fluoride. The autoclave was opened and the contents found to weigh 118 grams. The liner was placed overnight in a hood-draft and lost 24 grams to a final net weight of 94 grams, essentially hydrogen-fluoride free. The product was broken down into the following portions: 25 grams which was completely water insoluble; 22 grams which was insoluble in cold water and partially soluble in hot water; and 43 grams which was water soluble. The portion of the product insoluble in cold water and partially soluble in hot water melted at 159–161° C. and was shown by crystalline form and mixed melting point to be identical with the previously identified sample of 1,1-di-p-tolyl-1-desoxy-D-glucitol. The water soluble portion of the product also contained a substantial amount of the above compound, together with another component or components not identified. The solubility of the di-tolylglucitol in water is apparently increased by the presence of the unknown, more soluble material. The more water soluble product is possibly the monotolylglucitol.

Thus cellulose and glucose are probably interchangeable in the reaction with toluene to give the same products but not necessarily with equivalent yields. For laboratory purposes glucose may be employed more conveniently than cellulose because of the bulky nature of the latter. Furthermore, economic factors would lead one to the use of glucose, in the form of corn syrup perhaps, as a more economical starting material.

EXAMPLE IV

The preparation of 1,1-di-p-tolyl-1-desoxy-D-glucitol from cellulose and toluene and from glucose and toluene has been described in Examples I and III, respectively. The present example gives data from a number of preparations of that material carried out primarily to make a large quantity for further laboratory work. In the course of the preparative work, additional knowledge about increasing yields has been obtained. It has been possible to obtain pure sharply melting 1,1-di-p-tolyl-1-desoxy-D-glucitol in yields up to about 70% based upon the weight of the cellulose charged. There is an additional material containing a substantial amount of the pure substance together with other reaction products in which glucose and toluene are respectively probably combined in the ratio of 1:1, 2:2, and/or 3 or 4:2. Such compounds are alcohol soluble by virtue of their relatively larger hydrophilic part of the molecule.

The procedure followed in the first three experiments of this series is similar to that described in Example I. In these experiments, the reactants were charged into a turbomixer (containing a 1 liter nickel liner), stirred for the designated time at the temperature employed and finally the contents of the reactor were flushed with nitrogen. The treatment of the products obtained varied somewhat in each case. The following table summarizes the data obtained:

Table II.—Reaction of cellulose or glucose with toluene in the presence of hydrogen fluoride

| Run No | 11 | 12 | 13 |
|---|---|---|---|
| Conditions of Reaction: | | | |
| Temperature, °C | 0 | 0 | 0 |
| Contact time, hours | 2 | 2 | 2 |
| Reactants: | | | |
| Hydrogen fluoride, gms | 215 | 228 | 235 |
| Toluene, gms | 175 | 174 | 172 |
| Cellulose, gms | 81 | 0 | 81 |
| Glucose, gms | 0 | 90 | 0 |
| Recovery, gms.: Hydrogen fluoride | | 176 | 195 |
| Contents of autoclave after nitrogen sweeping, gms | 103 | 113 | 130 |

The crude product from Run 11 was treated in various ways in order to determine a possible method for obtaining 1,1-di-p-tolyl-1-desoxy-D-glucitol in pure form. Recrystallization from water, alcohol, alcohol-water mixtures, chloroform, and acetone was attempted. The best solvent for this purpose was found to be water.

Virtually all of the crude product recovered from run 12 was soluble in 750 ml. of boiling water. This was filtered and charcoal added and the hot solution filtered again. The filtrate was evaporated, then redissolved in 400 ml. of water. This solution was then made alkaline with ammonium hydroxide. A brown amorphous precipitate which formed was filtered off and the filtrate concentrated. 45 grams of this dark brown material was obtained.

From run 13, a 40 gram portion of the crude product was dissolved in cold water and filtrated. A small quantity (1.8 grams) of dry crystals was obtained. The filtrate was neutralized with 30 grams of potassium carbonate and evaporated over steam. By computing the portion of potassium fluoride that should be present as a solid in the dry product, it is assumed that 39 grams of the desired product was recovered. The remainder of the product from this run was then treated in this same manner.

In the following experiments, the reactants were charged into the turbomixer containing a nickel liner as before. They were stirred for the designated time at the temperature employed. The autoclave was then removed from the turbomixer and super-cooled ice added directly to the liner contents. The solid product which separated at this stage was then filtered off in a Büchner funnel. The filtrate was discarded. The wet cake from the Büchner funnel was dried over steam and weighed The dried cake was then treated in one of two ways: it was either hydrolyzed with boiling water and then extracted with ether or vice versa. In either case the dry material obtained was then dissolved in boiling water and filtered. The filtrate was set aside to cool and the product crystallized out on standing. The product was then filtered off and dried after which its melting point was determined. The following table summarizes the data obtained:

fied with nitric acid. This theoretical value for the nitrogen content is 6.4%.

*Table III.—Reaction of cellulose with toluene in the presence of hydrogen fluoride*

| Run No. | 14 | 15 | 16 | 17 | 18 | 19 | 20 |
|---|---|---|---|---|---|---|---|
| Conditions of Reaction: | | | | | | | |
| Temperature, °C | 0 | 0 | 0 | 0 | 0 | 0 | 0 |
| Contact Time, Hrs | 3 | 3 | 3 | 5 | 1 | 3 | 20 |
| Reactants: | | | | | | | |
| Hydrogen Fluoride, gms | 235 | 210 | 232 | 213 | 217 | 228 | 205 |
| Toluene, gms | 172 | 174 | 129 | 172 | 173 | 172 | 173 |
| Cellulose, gms | 81 | 41 | 41 | 41 | 50 | 50 | 50 |
| Recovery: | | | | | | | |
| Toluene, ml | 75 | 6 | Trace | Trace | 90 | Trace | Trace |
| Cellulosic material, gms | 4 | | 6 | 4 | 3.5 | 4 | 8 |
| Dried Untreated Product, gms | 60 | 72 | 77 | 83 | 60 | 88 | 113 |
| Ether soluble material, gms | | | 22 | 19 | 4 | 22 | 60 |
| Dry ether extracted product, gms | | | 52 | 58 | 57 | 45 | 42 |
| Dry recrystallized product, gms | 17 | | a 28 | b 213 | b 20 | a 26 | a 20 | a Ether extraction after hydrolysis.
b Ether extraction before hydrolysis.

The dry recrystallized product was pure 1,1-p-tolyl-1-desoxy-D-glucitol, melting point 157–159° C. It should be observed that the contact time affects the yield of products. The water soluble product obtained, although not mentioned in the table, was investigated and will be described hereinafter. It should be noted also that along contact time decreases the yield of 1,1-di-p-tolyl-1-desoxy-D-glucitol and increases the yield of ether soluble material. A short contact time (1 hour) reduces the yield of the ether soluble material and also leaves a large amount of toluene unreacted.

EXAMPLE V

In Example II, the nitration of 1,1-di-p-tolyl-1-desoxy-D-glucitol was described. Further nitrations of this compound have been conducted and are described as follows: 37.5 ml. of concentrated nitric acid was cooled to 0° C. by immersion of its container in an ice-salt bath. To this was then added 2.5 gms. of 1,1-di-p-tolyl-1-desoxy-D-glucitol. The mixture was stirred and maintained at 0° C. while 37.5 ml. of concentrated sulfuric acid (28%) was added dropwise. A yellow-orange product appeared in the reaction mixture. The reaction mixture was then poured over ice and the solid product which separated was filtered. This yellow-orange product was then boiled with water and filtered, and this latter procedure repeated. On drying, 4.8 grams of an amorphous product was obtained.

2.5 grams of 1,1-di-p-tolyl-1-desoxy-D-glucitol was nitrated by adding the compound to 37.5 ml. of concentrated acid cooled to 0° C. by means of an ice-salt mixture. The nitric acid solution was then poured over ice. No product separated at this point so the solution was heated to boiling, filtered, and set aside to cool in a refrigerator. A precipitate was obtained with a melting point of 100–112° C. The nitrogen content of the precipitate was 17.22%. This is an exceptionally high nitrogen content. To check the results obtained, a duplicate experiment was made in which again, 2.5 grams of 1,1-di-p-tolyl-1-desoxy-D-glucitol were added to 37.5 ml. of concentrated nitric acid cooled to 0° C. by an ice-salt mixture. The nitric acid reaction mixture was removed from the ice-salt bath and allowed to stand until the temperature reached 20° C., at which time the mixture was poured over ice and yellow precipitate separated. The nitrogen content of the product was 5.07%, the carbon content 55.62%, and the hydrogen content 5.03%. This product was soluble in ether, acetone, and chloroform, but insoluble in toluene. It may be assumed the high value of nitrogen reported in the first experiment was due to contamination of the product with nitric acid and/or oxides of nitrogen. The value of 5.07% for the nitrogen content of the product would correspond to 1,1-di-p-tolyl-1-desoxy-D-glucitol with two of the hydroxyl groups of the carbohydrate chain esterified with nitric acid. This theoretical value for the nitrogen content is 6.4%.

EXAMPLE VI

Two resins of the alkyl type were produced from 1,1-di-p-tolyl-1-desoxy-D-glucitol and phthalic anhydride. In one case an excess of phthalic anhydride was used; in the other case a deficiency. The experiments were conducted as follows: 1 gram of 1,1-di-p-tolyl-1-desoxy-D-glucitol and 2.5 grams of phthalic anhydride were placed in a flask. The mixture was heated for approximately 20 minutes at 200–250° C. The material was dissolved in acetone and the acetone then evaporated. The residue was then boiled with water and the water-soluble resinous material filtered off. A brown colored brittle material was obtained.

In another experiment, 2 grams of 1,1-di-p-tolyl-1-desoxy-D-glucitol was placed in a beaker with 1.2 grams of phthalic anhydride. The mixture was heated at approximately 200–250° C. for 20 minutes. A brown colored brittle material was obtained.

The two resins produced were similar in appearance; however, the one produced by using an excess of phthalic anhydride was more brittle.

EXAMPLE VII

The reaction of toluene with glucose has been described previously in Example III. In this example, a modified laboratory procedure for the preparation of 1,1-di-p-tolyl-1-desoxy-D-glucitol from glucose is described. This modified procedure is based upon the insolubility of lithium fluoride, which allows a neutralization of the hydrogen fluoride by lithium hydroxide after the reaction has been completed. Subsequent filtration removes lithium fluoride from the water soluble organic products of the reaction.

An outline of the procedure used in reacting glucose or cellulose with toluene and which is used in some of the experiments in the following examples, is as follows: into a one liter turbomixer was sealed 50 grams of the carbohydrate (either glucose or cellulose) and a considerable molar excess of toluene (172 grams). The autoclave was cooled to about −50° C. and a charge of anhydrous hydrogen fluoride added (about 230 grams). An ice bath was placed around the autoclave which was stirred for a specified period of 0° C. Then, a rapid stream of nitrogen was passed through the reaction mixture for one to two hours while continuing to stir at 0° C. This removed most of the hydrogen fluoride and a large part of the toluene. After terminating the nitrogen stream, the autoclave was evacuated on a vacuum line for about 5 minutes. The autoclave was then opened and the contents tansferred to a silver dish. This was allowed to stand in a vigorous hood-draft for a number of hours. The product now contained only 10–20 grams of occluded hydrogen fluoride. It was next separated into two segments, cold water soluble and insoluble, respectively. The water solution was brought to a pH of 9 with a solution of lithium hydroxide of known concentration. The precipitate of lithium fluoride was filtered off and the filtrate concentrated to dryness. The residue was treated with about 400 ml. of water and a second batch of lithium fluoride filtered off. The filtrate was now essentially free of lithium salts and was taken to dryness over a steam bath. Thereafter, the water soluble and insoluble portions of the product were investigated for the purpose of separating out pure chemicals therefrom.

In a cellulose-toluene reaction, 231 grams of hydrogen fluoride, 50 grams of cellulose, and 172 grams of toluene were contacted for 3 hours at 0° C. in a turbomixer, after which time a rapid stream of nitrogen was passed through the autoclave for one hour at 0° C. to sweep out most of the hydrogen fluoride. The autoclave was opened and the contents poured into a silver dish which stood in a hood-draft for 18 hours at room temperature. The net product at that point was 144 grams. The 144 grams was washed twice with 400 ml. of cold water, then boiled for 20 minutes with 600 ml. of water. After cooling, the solution was filtered and the solid removed thereby was dried under a lamp. From this solid (64 grams) an ether soluble portion of the reaction product amounting to 24 grams was extracted. The remainder of the solid product which was not soluble in ether was crystallized from water in which it was sparingly soluble at the boiling point. 20 grams of 1,1-di-p-tolyl-1-desoxy-D-glucitol (melting point 150–156° C.) was isolated. The water solutions from the first extraction of the crude solid product, including the filtrate from the filtration step, were neutralized with a solution of lithium hydroxide. The precipitated lithium fluoride was filtered off and the filtrate taken to dryness over a steam bath. The residue was dissolved in about 200 ml. of water, and a small quantity of additional lithium fluoride filtered off. The filtrate was then concentrated to yield a heavy syrup, weighing 34 grams.

Glucose and toluene were reacted for 3 hours at 0° C. in a procedure identical with the cellulose experiment described above. In this experiment, the reactants were 234 grams of hydrogen fluoride, 50 grams of glucose, and 172 grams of toluene. The product obtained when removed to a silver dish, weighed 119 grams. The 119 grams were transferred to a two liter beaker and thoroughly mixed with 500 ml. of cold water. The insoluble part was a yellow fluid mass. The water was decanted off and the insoluble part heated for 20 minutes with 700 ml. of boiling water. After cooling, the insoluble product, now a gray annular solid (67 grams) was dried. The 67 grams of dry solid was ether extracted and 15 grams of ether soluble products separated. The remainder was dissolved in 3½ liters of boiling water. On cooling, 18.5 grams of 1,1-di-p-tolyl-1-desoxy-D-glucitol was recovered; melting point 154–157° C. The water solutions were neutralized with lithium hydroxide and after removal of the insoluble lithium fluoride, concentration of the water solution yielded 23.6 grams of a heavy syrup.

EXAMPLE VIII

In previous examples, the reaction of an aldose sugar with a hydrocarbon in the presence of hydrogen fluoride was described. This following example contains a description of a rather intense study of the reaction of a ketose sugar, namely, fructose, with an aromatic hydrocarbon, toluene, in the presence of hydrogen fluoride. The reaction was studied mainly at 0° C. using contact times of from about 3 to about 66 hours; one reaction was studied at 30° C.

An outline of the procedure used in reacting d-fructose with toluene in the presence of hydrogen fluoride is as follows: d-fructose and toluene were sealed into a 1 liter turbomixer. After cooling to about −40° C., hydrogen fluoride was pressured into the system from a weighed bomb and the contactor stirred for the required time at ice temperature (in one case at 30° C.). A stream of nitrogen was then passed through the reactor for 1–3 hours; this removed most of the hydrogen fluoride. The autoclave was opened and the contents transferred to a silver dish which was subsequently placed in a hood-draft for 18–24 hours. The hydrogen fluoride still remaining in the product was only about 20 grams at this point. Then the product was washed thoroughly with pentane to remove any pentane-soluble component, after which it was separated into a cold water soluble and cold water insoluble fraction. Each of these portions was then separately worked up to separate pure compounds therefrom.

Table IV.—Reaction of d-fructose with toluene in the presence of hydrogen fluoride Charge (b):  Grams
  d-Fructose  50
  Toluene  170
  HF  220

| Run No. | 21 | 22 | 23 | 24 | 25 | 26 | 27 |
|---|---|---|---|---|---|---|---|
| Conditions of Reaction: | | | | | | | |
| Temp., ° C. | 0 | 0 | 0 | 0 | 0 | 0 | 30 |
| Contact Time, Hrs. | 3 | 5 | 16.7 | 20 | 45 | 66 | 3 |
| Recovery, Gms.: | | | | | | | |
| Pentane-Soluble | | 2 | 2 | 1 | | 10 | 24 |
| Water-Soluble | 42 | 50 | 39 | 35 | 15 | 10 | 1.3 |
| Water-Insoluble a | 7 | 15 | 35 | 48 | 84 | 139 | 84 |
| Net Total | 49 | 67 | 76 | 84 | 99 | 159 | 109.3 |
| Toluene Reacted, Gms. | 0 | 17 | 26 | 34 | 49 | 91 | 59 |
| Percent of Water-Soluble Material, Also Acetone-Soluble | 44 | 56 | 83 | 97 | 100 | 100 | 50 |
| Acetone-Soluble, Gms. | 18 | 28 | 32 | 34 | 15 | 10 | 0.6 |
| Yield of $C_{18}H_{18}O_5$, Gms. | 9 | 14 | 20 | 19 | 2 | | 0 |
| Yield of $C_{18}H_{22}O_3$, Gms. | | 5 | 11 | 16 | 28 | 46 | |
| Percent of $C_{20}H_{24}O_3$, in Water-Soluble Fraction b | | | 39 | 31 | 37 | 33 | 0 | a Exclusive of pentane-soluble.
b In run 26 the charge was: d-fructose, 75 grams; toluene, 215 grams; HF, 336 grams.

In the previous examples relating to the glucose- and cellulose-toluene reactions, it was shown that at 0° C. and 3 hours contacting time, sufficient reaction occurred to involve about two molecules of toluene with a glucose residue and an important product of the reaction was 1,1-di-p-tolyl-1-desoxy-D-glucitol. In working with fructose at 0° C. it was observed that a much slower reaction took place. Three hours of contacting at 0° C. resulted in only a negligible amount of reaction of toluene with fructose. As the contact time was increased, the amount of toluene reacted, rose rapidly. The data show that the water-soluble portion first increases rapidly with time and then falls off, while there is a steady increase of the insoluble fraction with time.

An examination of the water-soluble part showed that it contained an acetone-soluble part consisting essentially of a pure compound melting at 123° C., and analyzing clearly for the formula $C_{13}H_{18}O_5$. Chromic acid oxidation of this compound resulted in the production of terephthalic acid. Its structure is, therefore, regarded as:

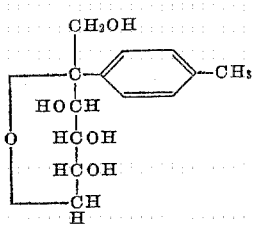

The water-insoluble portion of the reaction products contained another compound which could be isolated by extraction and crystallization with n-propyl alcohol, by which method it was recovered in quantities amounting to about 30% of the insoluble fraction. This substance melts at 210° C. and corresponds to the empirical formula for $C_{20}H_{24}O_3$. This compound could not be fixed in molecular weight because it always associated with itself or with the solvent employed. Chromic acid oxidation of the compound yielded 4,4'-dicarboxybenzophenone. The exact structure of this compound has not been determined. It has a very useful characteristic, however, in that it forms firm gels with benzene and other hydrocarbons. When benzene is heated to the boiling point with about 5% of this compound, the cooled solution sets to a stiff gel. It has also been observed to gel pentane, cyclohexane, and several other hydrocarbons.

Components of higher complexity than the two pure compounds isolated, are high in amount in the product. Chromic acid oxidation of the water-insoluble part of the product which had been depleted of its content of the pure compound melting at 210° C., gave both terephthalic acid, and 4,4'-dicarboxybenzophenone. This indicates a carbohydrate chain in which one of its carbon atoms is attached to two tolyl groups and an additional carbon atom (or more) attached to a single tolyl group.

Run 26 in Table IV employed a higher concentration of reactants than the other runs. A very long contact time (66 hours) was used and this was found to enhance still further the conversion of fructose into the pure compound melting at 210° C. The conversion of 75 grams of fructose gave 46 grams of this compound.

Run 27 in Table IV employed 30° C. for the reaction. The course of the reaction here was markedly different. More toluene reacted in three hours at 30° than in 45 hours at 0° C. While the investigation was not intensive, no successful isolation of any pure compound from the product which was nearly all water-insoluble resulted. A noteworthy distinction from the product at 0° C. was the large fraction of pentane-soluble product found.

EXAMPLE IX 1-sorbose was reacted with toluene in the presence of hydrogen fluoride in a manner similar to that described in Examples VII and VIII. The following reactants were charged to a 1100 milliliter turbomixer autoclave: 50 grams of 1-sorbose, 172 grams of toluene, and 234 grams of HF. The mixture was contacted for 45 hours at 0° C. and atmospheric pressure. Most of the hydrogen fluoride was flushed from the system by passing a stream of nitrogen through the autoclave. The reaction product, when practically free of hydrogen fluoride, weighed 126 grams. From this 126 grams was obtained 82.5 grams of a toluene-free, HF-free product. This product was separated into 7 grams of pentane-soluble material, 14 grams of water-soluble material, and 61.5 grams of water-insoluble product, 18.5 grams of a pure material melting at 215° C. was obtained. Chromic acid oxidation of a portion of this pure material yielded 4,4'-dicarboxybenzophenone identified by a methyl ester melting at 222–224° C. Equal parts of the sorbose product melting at 215° C. and the fructose-toluene product melting at 209–210° C. (Example VIII) gave a mixed melting point of 204–206° C. and the compounds are, therefore, assumed not to be identical. This sorbose-toluene reaction product formed a clear stable gel with benzene when added thereto in about 5% by weight.

EXAMPLE X

This example relates to the preparation of 1-p-tolyl-1-(4-methylcyclohexyl)-1-desoxy-D-glucitol by the catalytic hydrogenation of 1,1-di-p-tolyl-1-desoxy-D-glucitol in the presence of a platinum catalyst and in the presence of nickel-kieselguhr.

In one experiment, 0.4996 gram of 1,1-di-p-tolyl-1-desoxy-D-glucitol were charged to a hydrogenation apparatus along with 0.0558 gram of platinum catalyst, 10 cc. of tetrahydrofuran and 0.5 cc. of acetic acid. These materials were kept under atmospheric hydrogen pressure for 168 hours. At the end of this time, sufficient hydrogen had been absorbed to give a calculated hydrogen number of $1.9 \pm .5$ compared with a theoretical value of 6. Under similar conditions, ordinary aromatic compounds hydrogenate easily and rapidly to saturation. It is apparent that 1,1-di-p-tolyl-1-desoxy-D-glucitol accepts hydrogen with difficulty.

In another experiment, 10 grams of 1,1-di-p-tolyl-1-desoxy-D-glucitol were dissolved in 150 ml. of ethyl alcohol placed in a high pressure rotating autoclave along with 5 grams of nickel-kieselguhr catalyst. 100 atmospheres of hydrogen was then pressured into the autoclave, after which the autoclave was heated to 130° C. for 2 hours. On cooling, it was noted that 13 atmospheres of hydrogen had been absorbed, which on the basis of the size of the autoclave used, gave a calculated hydrogen number of 5.4. The product was obviously a mixture of different compounds, but one pure compound melting sharply at 140–141° C. was isolated. This pure compound corresponds to the formula $C_{20}H_{32}O_5 \cdot H_2O$, which would correspond to the hydrogenation of one of the two tolyl rings. The elementary analysis is $C_{20}H_{32}O_5 \cdot H_2O$ is: carbon: 65.70% found, and 64.84% calculated; hydrogen: 9.25% found, and 9.32% calculated.

In the next experiment, 15 grams of 1,1-di-p-tolyl-1-desoxy-D-glucitol was placed in a high pressure rotating autoclave along with 150 ml. of 95% ethanol and 5 grams of nickel-kieselguhr catalyst. The autoclave was charged to 100 atmospheres with hydrogen and heated as high as 150° C. during a six-hour period. The calculated hydrogen number here was 5.6. The final gas in the system was not analyzed, but it is believed that some decomposition occurs at 150° C., and therefore, the values for hydrogen consumption are not trustworthy. Although the product obtained was complex, the same product as separated heretofore corresponding to $C_{20}H_{32}O_5 \cdot H_2O$ was obtained. The elementary analysis found for the product was close to the theoretical value.

In another similar experiment with nickel catalyst in a high pressure autoclave, it was observed that heating for two hours at 100° C., did not bring about more hydrogen absorption. A total product from this experiment was obtained in a crystalline form; its melting point of 92–120° C. showed it to be a mixture of at least two compounds. From this reaction product, a pure compound melting at 140–141° was isolated and which elementary analysis corresponded to $C_{20}H_{32}O_5$. A mixed melting point as well as elementary analysis showed this to be different from the similarly melting product described in the previous experiments.

EXAMPLE XI

In this example, 50 grams of glucose was sealed in an 850 cc. rotating autoclave, to which was added 64 grams of isobutane and 139 grams of hydrogen fluoride after cooling. The autoclave was then allowed to warm to room temperature and the reactants were kept in contact for 1534 hours (64 days) during which time the autoclave was rotated 23% of the time. The reaction product was then isolated by releasing the pressure in the system through a line from the top of the autoclave, followed by purging of the autoclave with nitrogen, then removing the remaining materials. The hydrogen fluoride and unreacted isobutane were condensed and the amounts recovered determined. 48 grams of condensable gas consisting essentially of isobutane was recovered. A solid product was obtained weighing 50 grams and which was hydrogen fluoride free.

The product was separated into three portions as follows:

(A) This portion, weighing two grams, was soluble in water and did not reduce Fehling's solution.

(B) This portion, weighing 14 grams was soluble in benzene, n-propyl alcohol, and ethyl alcohol, and slightly soluble in boiling pentane. It was a dark red viscous oil, fluorine-free, and whose elementary analysis is given in the following table:

|  | Percent Carbon | Percent Hydrogen | Percent Ash |
|---|---|---|---|
| Found | 55.39 | 7.56 | 0 |
| Calculated $C_{10}H_{16}O_5$ | 55.54 | 7.46 | |

(C) A portion, weighing 34 grams, was obtained, and which was insoluble in water and benzene and about 8% soluble in pyridine. By elementary analysis it was found to contain 67.92% carbon, 7.14% hydrogen, and 2.96% ash.

From the amount of isobutane recovered, it was calculated that the isobutane entering the reaction was approximately molecularly equal to the glucose in the system. The benzene-soluble yield, a viscous material analyzing $C_{10}H_{16}O_5$ (empirical formula), indicates one butane unit and one glucose unit minus some hydrogen. It is not suggested that this segment actually is an individual; it is undoubtedly complex in nature. The conclusion was, however, that isobutane must have entered into the reaction because this material is 63% carbon and hydrogen as compared to only 47% carbon and hydrogen in the starting glucose. The insoluble part of the product had an even greater carbon and hydrogen content, 75%; however, it is somewhat contaminated with inorganic materials.

By analogy with the products obtained by the hydrogen fluoride catalyzed reaction of cellulose or glucose with toluene, as described in previous examples, it might be expected that the isobutane would attach itself to the aldehyde carbon atom and give a product of the following structure:

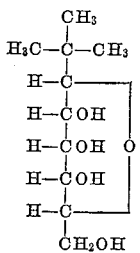

However, it is also possible that the sugar undergoes dehydration to an olefin-acting substance which could alkylate isobutane in the center part of the sugar chain. It is unexpected that anhydrous hydrogen fluoride will catalyze the condensation of a carbohydrate such as glucose with an isoparaffinic hydrocarbon such as isobutane. The expected conversion would necessarily entail an extensive dehydration of the carbohydrate because of the strong dehydrating action of anhydrous hydrogen fluoride and of hydrofluoric acid of from about 85 to about 100% HF concentration.

EXAMPLE XII

This example describes a study of the reaction of cellulose, a polysaccharide, with dodecylbenzene in the presence of hydrogen fluoride. The reaction was studied mainly at 0° C. using contact times of from about 3 to about 70 hours; one reaction was studied at about 30° C.

The experimental procedure followed the outline given in Example VIII for the reaction of d-fructose with toluene. The following table lists the experiments carried out, the conditions used, and the reaction products obtained:

Table V.—Reaction of cellulose with dodecylbenzene in the presence of hydrogen fluoride

| Run No | 28 | 29 | 30 | 31 | 32 | 33 |
|---|---|---|---|---|---|---|
| Charge, Gms.: | | | | | | |
| Cellulose | 30 | 30 | 41 | 61 | 61 | 60 |
| Dodecylbenzene | 100 | 100 | 172 | b176 | 258 | 260 |
| Hydrogen Fluoride | 228 | 227 | 232 | 236 | 238 | 239 |
| Conditions: | | | | | | |
| Temp., °C | 0 | 0 | 0 | 0 | 0 | 34 |
| Contact Time, Hrs | 3 | 5.5 | 21 | 44 | 70 | 16 |
| Recovery, Gms.: | | | | | | |
| Water-Soluble | | | 25 | 39 | 54 | (a) |
| Water-Insoluble | | | 160 | 160 | 260 | |
| Dodecylbenzene | >83 | 91 | 140 | 149 | 234 | 152 |
| B.P.>Dodecylbenzene | Trace | 5 | 20 | 10 | 26 | 122 | a Water-soluble material low and not determined. This run in addition to the noted products, give 30 grams of a sludge, insoluble in both benzene and water.
b Recycled dodecylbenzene utilized in previous runs.

The dodecylbenzene used in the above experiments was a fraction boiling at 290° C. from the major plateau in the $C_{18}$ range of a product from the alkylation of benzene with propylene tetramer. This material was completely resistant to oxidation by chromic acid or alkaline potassium permanganate solutions, indicating that the alpha carbon atom attached to the aromatic nucleus had 3 other substituent groups. All of the work was carried out at a reaction temperature of 0° C. except one run at 34° C. It was noted that when the first experiment (run 28) was completed, that dodecylbenzene is far less reactive than toluene since no reaction was observed during three hours of contacting at 0° C. When the contacting time was extended to 5.5 hours (run 29), 5 grams of a higher boiling segment, believed to be the reaction product, was isolated. This segment was not identified further.

In the next experiment, run 30, the contacting was continued for 21 hours. From this reaction, 160 grams of an ether-soluble-water-insoluble segment was obtained, along with 40 grams of a water-soluble-ether-insoluble material. The 160 gram fraction was separated by ordinary distillation followed by steam distillation and 140 grams of dodecylbenzene was recovered along with 20 grams of a higher boiling product. This 20 grams was dissolved in pentane and upon evaporation yielded a brown material of a buttery consistency, resembling a fiber grease. This material was surface-active as evidenced by its imparting a soapy feeling when washed with. Elementary analysis for carbon and hydrogen are as follows. carbon: 80.12% found, and 77.01% calculated for $C_{42}H_{70}O_5$; hydrogen: 10.73% found, and 10.77% calculated for $C_{42}H_{70}O_5$. This elementary analysis is in fairly good agreement with that demanded by the structure:

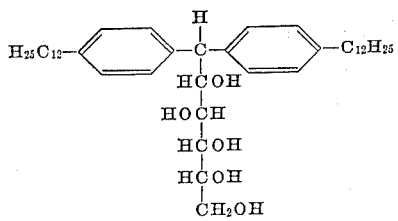

This product was tested as an additive for a lube oil for enhancing its viscosity index. The viscosity index for the base stock (a Pennsylvania lube oil) was 102.7; with 5.1% of the product dissolved therein, its viscosity index was raised to 113.1. The ether-insoluble-water-soluble portion of the product (40 grams) was dissolved in water and evaporated to dryness. During this evaporation some hydrogen fluoride was evolved. 25 grams of a dry brown powder was obtained; its elementary analysis found was: carbon, 39.22%; hydrogen, 6.05%.

While reaction times of at least five hours at 0° C. were necessary to get appreciable reaction of dodecylbenzene with cellulose, there was, on the other hand, little improvement in yields at reaction times above 20 hours. This would indicate that the dodecylbenzene used became depleted of a reactive isomer, leaving a refractory material. This conclusion is borne out by the data of run 31, Table V. In run 31 the dodecylbenzene charged was recycle material from previous runs and it will be observed that the product (boiling point greater than dodecylbenzene) was only 50% of run 30. The reactive isomer had apparently been substantially exhausted in previous runs.

From run 32, Table V, 26 grams of a brown paste similar to that previously described, was obtained. The surface-active properties of this paste were evaluated by dissolving 2.61 grams per liter in benzene. The interfacial tension (benzene/$H_2O$) was 6.3 dynes/cm., in comparison to 27.3 dynes/cm. for pure benzene. The surface tension (air-liquid) of this solution was 26.2 dynes/cm. in comparison to 28.2 dynes/cm. for pure benzene. Further tests with this product also indicated that it was effective for increasing the viscosity index of various lube oils.

The effect of temperature upon the reaction is shown in run 33, carried out at 34° C. Here the conversion of dodecylbenzene was severalfold greater than from similar runs at 0° C. This indicates that even the more refractory isomers of the dodecylbenzene react at elevated temperature. The product in physical appearance and the composition was similar to the 0° C. material. A portion of the product was hydrogenated catalytically with 5 grams of a nickel-kieselguhr catalyst at 100° C. under 100 atmospheres of hydrogen pressure. The results demonstrated that 320 ml. of hydrogen per gram were absorbed.

One gram of the water-insoluble-ether-soluble product boiling above dodecylbenzene from run 32 was added to 40 ml. of concentrated nitric acid at 0° C. 40 ml. of concentrated sulfuric acid was then added dropwise at 0° C., the sample dissolved slowly. After standing 20 hours at 25° C., ice was added to precipitate out a yellow product. This was water washed, dried, and on analysis for nitrogen was found to contain 5.28% nitrogen.

EXAMPLE XIII

The pentaacetate of 1,1-di-p-tolyl-1-desoxy-D-glucitol was prepared by heating the ditolyl glucitol with acetic anhydride in the presence of sodium acetate.

One gram of the ester obtained was then added to 40 ml. of concentrated nitric acid at 0° C. The 40 ml. of concentrated sulfuric acid were added dropwise. The ester went into solution slowly. The mixture was allowed to stand for 3 hours at a temperature not exceeding 25° C., after which time it was poured on to ice. The white precipitate which separated was removed by filtration, then recrystallized from n-heptane. The nitrogen content of this product was found to be 6.28%. The product underwent decomposition when exposed to the atmosphere for several days, changing in color from white to yellowish brown. When kept in a desiccator, decomposition was considerably retarded.

In a separate experiment, one gram of the ester was added to a solution of one gram of potassium nitrate in 30 ml. of concentrated sulfuric acid. The ester went into solution slowly. The mixture was allowed to stand for one-half hour at approximately 30° C., after which time it was poured onto ice. The white precipitate which separated was removed by filtration and washed well with water. After standing for several days exposed to the atmosphere, the white solid changed in appearance to a yellow-brown syrupy material.

EXAMPLE XIV

The following experiments were conducted to obtain data in regard to the constitution of the products and the progressive reactions of the various products in the glucose-toluene-hydrogen fluoride reaction system, and to determine the effect of contact time upon the reaction of toluene with glucose or cellulose at the two temperatures, 0° C. and 30° C. The procedure utilized in this example is similar to that described in Examples VII and VIII. A summary of the results obtained is given in the following 3 tables:

*Table VI.*—Reaction of glucose with toluene in the presence of hydrogen fluoride at 0° C.

Charge: Grams
d-Glucose _____ 50
Toluene _____ 170
Hydrogen fluoride _____ 220±15

| Run No. | 34 | 35 | 36 | 37 | 38 | 39 |
|---|---|---|---|---|---|---|
| Contact Time, Hrs. | 0.5 | 0.5 | 3 | 5 | 20 | 66 |
| Recovery, Grams: | | | | | | |
| Water-Soluble @ 25° C. | | 66 | 46 | 26 | 25 | 11 |
| Water-Insoluble @ 25° C. | 13 | 9 | 34 | 59 | 69 | 83 |
| Pentane-Soluble | 1 | | | | 1 | |
| Total Toluene-Free Organic | | 75 | 80 | 85 | 94 | 94 |
| Toluene Reacted, Grams | | 25 | 30 | 35 | 44 | 44 |
| Ratio, Mols Toluene/Mols Glucose | | 1.0 | 1.2 | 1.4 | 1.8 | 1.8 |
| Characterized Products, Grams: | | | | | | |
| A | 12 | 8 | 20 | 18 | 20 | 8 |
| B | 0 | 0 | (a) | (a) | (b) | 2 |
| C | 0 | 0 | (a) | (a) | (a) | (a) |
| D | 1 | | | | 1 | | a Presumed present; not isolated.
b Identified in small amounts; yield unknown.

*Table VII.*—Reaction of glucose with toluene in the presence of hydrogen fluoride at 30° C.

Charge: Grams
Glucose _____ 50
Toluene _____ 170
Hydrogen fluoride _____ 220±15

| Run No. | 40 | 41 | 42 | 43 | 44 | 45 |
|---|---|---|---|---|---|---|
| Contact Time, Hrs. | 0.5 | 1.5 | 3 | 20 | 20 | 66 |
| Recovery Grams: | | | | | | |
| Water-Soluble @ 25° C. | 31 | 26 | 11 | 30 | 24 | 13 |
| Water-Insoluble @ 25° C. | 47 | 55 | 72 | 78 | 81 | 93 |
| Pentane-Soluble | | | 3 | | 25 | 45 |
| Total Toluene-Free Organic | 78 | 81 | 83 | 108 | 108 | 106 |
| Toluene Reacted, Grams | 28 | 31 | 33 | 58 | 58 | 56 |
| Ratio, Mols Toluene/Mols Glucose | 1.1 | 1.3 | 1.3 | 2.3 | 2.3 | 2.2 |
| Characterized Products, Grams: | | | | | | |
| A | 13 | 5 | <3 | 0 | 0 | 0 |
| B | 3 | 2 | 4 | 6 | (a) | (a) |
| C | 22 | 35 | 40 | 59 | (a) | (a) |
| D | | | 3 | | 25 | 45 | a Present; concentration not determined.

*Table VIII.—Reaction of cellulose with toluene in the presence of hydrogen fluoride at 0° C.*

Charge:

| | Grams |
|---|---|
| Cellulose | 50 |
| Toluene | 170 |
| Hydrogen fluoride | 220±15 |

| Run No | 46 | 47 | 48 |
|---|---|---|---|
| Contact Time, Hrs | 0.5 | 3 | 20 |
| Recovery, Grams: | | | |
| Water-Soluble @ 25° C | 53 | 43 | 42 |
| Water-Insoluble @ 25° C | 5 | 44 | 68 |
| Pentane-Soluble | 1 | | |
| Total Toluene-Free Organic | 58 | 87 | 110 |
| Toluene Reacted, Grams | 8 | 37 | 60 |
| Ratio, Mols Toluene/Mols Cellulose | 0.3 | 1.4 | 2.3 |
| Characterized Products, Grams: | | | |
| A | 4 | 26 | 20 |
| B | 0 | (a) | (a) |
| C | 0 | (a) | (a) |
| D | 1 | | | a Presumed present; not isolated.

From Tables VI, VII, and VIII it will be noted that the reaction products of glucose and of cellulose with toluene are the same and are dependent upon temperature and contact time. The four reaction products observed are referred to in the table as A, B, C, and D. The properties of these products are as follows:

A (Previously identified as 1,1-ditolyl-1-desoxy-D-glucitol)

Crystalline form:
  Usually slender prisms.
  Occasionally granules.
  Feathers from mineral oil.
  From water: 159–161° C. ($C_{20}H_{26}O_5 \cdot \frac{1}{2}H_2O$).
  From benzene: 157.5–158.5° C. ($C_{20}H_{26}O_5$).
Solubility in—
  Water: 0.01% at 0° C.
        0.7% at 100° C.
  Ethanol, 4 grams in 100 ml. at 25° C.
  Toluene, 1 gram in 75 ml. boiling solution.
  Benzene, 1 gram in 200–250 ml. boiling solution.
  Ethyl acetate, slightly soluble at 20° C.
  Mineral oil, soluble at 200° C.
Chromic acid oxidation product: 1,4-dicarboxybenzophenone.

B

Crystalline form: Usually amorphous gel.
  Occasionally needles.
Melting point: 212–215° C.
Empirical formula: $C_{13}H_{18}O_5$.
Solubility:
  Water, moderately soluble at 20° C.
  Alcohol, soluble cold.
  Ethyl acetate, soluble.
  Ether, insoluble.
Chromic acid oxidation products:
  No terephthalic acid.
  No 4,4'-dicarboxybenzophenone.

C

Crystalline form: yellow amorphous granules.
Melting point: 70–80° C.
Solubility:
  Water at 100° C., insoluble.
  Ether, very soluble.
  Benzene, soluble cold.
  Acetone, very soluble.
  Generally soluble in warm aliphatic hydrocarbons.
Chromic acid oxidation product: terephthalic acid.

D (A viscous oil, deep red color, pentane soluble)

Elementary analysis:
  Percent carbon_____ 91.60
  Percent hydrogen____ 7.92
Molecular weight, 394 (found cryoscopically)
Chromic acid oxidation product: mostly terephthalic acid, some small amounts of 4,4'-dicarboxybenzophenone.

Another product isomeric with B above has also been noted in many experiments, although it has never been obtained in pure form. For simplification of the following discussion it will be referred to as product E and is characterized as follows:

E

Crystalline form: prisms; never obtained pure.
Solubility:
  Water, very soluble cold.
  Ether, insoluble.
  Benzene, almost insoluble.
  Methanol and ethanol, soluble.
Chromic acid oxidation product: terephthalic acid.
Elementary analysis: approximately $C_{13}H_{18}O_5$.

From an examination of the foregoing tables, the following conclusions have been deduced:

(1) At 0° or 30° C., the amount of toluene which reacts with glucose or cellulose increases with time up to about 20 hours after which, although more toluene may not enter the reaction, the nature of the product continues to change.

(2) At 0° C., product A reaches a maximum in the time range of from about 3 to about 20 hours, then falls off.

(3) At 30° C., product A is present in appreciable amounts at short contact times; it falls off in amounts approaching almost nothing at long contact times.

(4) Product B is found at 0° C. only after long contacting; at 30° C., it was found at all times studied in about the same amounts.

(5) Product C was not identified from runs at 0° C. At 30° C., it soon became the principal product.

(6) Product D, the hydrocarbon oil, appears after about 3 hours time and then steadily increases with time.

(7) Cellulose and glucose give nearly identical reaction products, with the exception that at the shortest time studied (0.5 hour), less toluene reacted with cellulose than with glucose, probably due to a time lag in the breaking down of cellulose into glucose units.

EXAMPLE XV

In view of the information obtained in the preceding examples on the reaction of glucose or fructose with toluene in the presence of hydrogen fluoride, an extension of this reaction was conducted by contacting sucrose and molasses with toluene in the presence of hydrogen fluoride. Sucrose is α - D - glucopyranosyl - β - D - fructo-furanoside, which is a nonreducing dihexose. Sucrose, on the basis of previous reactions studies, should hydrolyze and yield a glucose and a fructose residue. These monosaccharides should then react with toluene yielding compounds similar to those already obtained independently from glucose and from fructose as set forth in previous examples. The procedure utilized in this example for the reaction and working up the products is similar to that described previously. A summary of the results obtained is given in the following table:

Table IX.—Reaction of sucrose or molasses with toluene in the presence of hydrogen fluoride at 0° C.

Charge: Grams
- Carbohydrate _____ 50
- Toluene _____ 170
- Hydrogen fluoride _____ 220±15

| Carbohydrates Used | Sucrose | | | | Molasses |
|---|---|---|---|---|---|
| Run No | 49 | 50 | 51 | 52 | 53 |
| Contact Time, Hrs | 0.5 | 3 | 20 | 20 | 66 |
| Recovery, Grams: | | | | | |
| Water-soluble at 25° C | 44 | 38 | 20 | 16 | 10 |
| Water-insoluble at 25° C | 13 | 40 | 68 | 65 | 84 |
| Pentane-soluble | 1 | 2 | 5 | | 2 |
| Total toluene-free organic | 57 | 78 | 83 | 81 | 94 |
| Toluene Reacted, grams | 7 | 28 | 33 | 31 | 44 |
| Ratio, mols toluene/mols carbohydrate | 0.3 | 1.1 | 1.3 | 1.3 | 1.8 |
| Characterized Products, grams: | | | | | |
| A | 6 | 15 | 6 | 1 | (a) |
| B | 0 | (a) | (a) | (a) | (a) |
| C | 0 | 0 | (a) | (a) | (a) |
| F | (a) | (a) | (b) | (a) | (a) |
| G | (a) | (a) | 7 | 2 | (a) | a Presumed present; not isolated.
b Identified in small amounts; yield unknown.

Products A, B, and C have been described fully in Example XIV. Product F, which is a compound of a formula $C_{13}H_{18}O_5$, has been described previously in Example VIII and is believed to have the following structure:

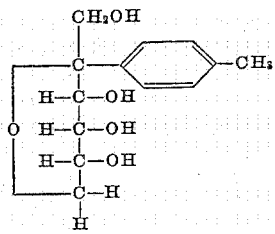

This product, which has a melting point of 123° C., did not depress the melting point of the same compound as isolated in Example VIII. Chromic acid oxidation again yielded terephthalic acid.

Product G has the empirical formula $C_{20}H_{24}O_3$ and its structure is believed to be:

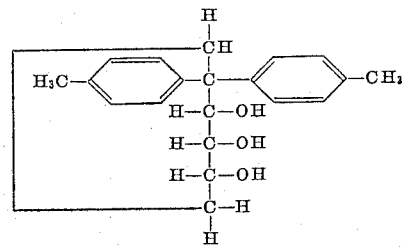

Chromic acid oxidation of this compound yielded 4,4'-dicarboxybenzophenone. This substance melts at 210° C.

From the results obtained it can be seen that sucrose was reacted with toluene at varying contact times. The products showed that the reaction mixture contained the compounds formed from glucose or fructose reacting alone. Compounds A and B were isolated in yields which indicate that conditions can be found for reacting sucrose to give substantial conversions to them. As was expected from the earlier work on fructose alone, product G did not appear in appreciable quantities unless long contacting times were used.

The virtual absence of fructose in the reaction at times up to three hours, at which time glucose is completely reacted with toluene, shows that the subject reaction, that is of sucrose with toluene, can be carried out to achieve, in effect, a separation of glucose and fructose units in sucrose by the conversion at short contact times of glucose into alkylated derivatives without substantially reacting fructose units.

The molasses used in runs 52 and 53 was a dry variety having the following approximate composition: sucrose, 52%; invert sugar, 25%; protein, 4%; ash, 10%; water and nonsugar organic material, 9%. The condensation of molasses with toluene was studied using 20 and 66 hour contacting times. From the former run, small amounts of compounds A and G were isolated, but from the 66 hour run, no chemical individual was isolated although the recovery of total toluene-free organic product indicated that a very substantial amount of toluene had entered into the reaction.

EXAMPLE XVI

In Example XIV, it was shown that the reaction of glucose and toluene gave a pentane-soluble oil after long contacting at 30° C. This pentane-soluble oil in some instances became the principal product. It has been referred to as product D, a red viscous pentane-soluble oil. This example describes the characteristics of this product D from various reactants.

The experiments were carried out in a procedure similar to that previously described except that the temperature utilized was 30° C. so that maximum yields of the desired pentane-soluble product were obtained.

The reactants and conditions utilized, and the products obtained are summarized in the following two tables:

Table X.—Condensation of aromatics with carbohydrates at 30° C.

| Run No | 54 | 55 | 56 | 57 | 58 | 59 | 60 |
|---|---|---|---|---|---|---|---|
| Contact Time, Hours | 108 | 38 | 70 | 3 | 24 | 66 | 58 |
| Charge, Grams: | | | | | | | |
| Glucose | 50 | 0 | 0 | 50 | 50 | 50 | 100 |
| Fructose | 0 | 50 | 75 | 0 | 0 | 0 | 0 |
| Benzene | 175 | 175 | 265 | 0 | 0 | 0 | 0 |
| Toluene | 0 | 0 | 0 | 170 | 170 | 170 | 344 |
| Hydrogen Fluoride | 242 | 231 | 347 | 242 | 224 | 235 | 333 |
| Recovery, Grams: | | | | | | | |
| Pentane-Soluble | 3.4 | 2.6 | 13.2 | 3 | 30.5 | 45 | 83.5 |
| Benzene-Soluble (Pentane-Insoluble) | 58.3 | 10.8 | 12.5 | 69 | 63.0 | 48 | |
| Water-Soluble | | | 1 | 11 | 17.0 | 13 | |
| Toluene | | | | | | | 166.6 |
| Total Toluene-Free Organic | 75 | 59 | 80 | 83 | 110.5 | 106 | |

Table XI.—Condensation of aromatics with carbohydrates at 30° C.

| Run No | 61 | 62 | 63 | 64 | 65 | 66 | 67 | 68 | 69 |
|---|---|---|---|---|---|---|---|---|---|
| Contact Time, Hours | 3 | 24 | 24 | 24 | 66 | 66 | 66 | 3 | 24 |
| Charge, Grams: | | | | | | | | | |
| Glucose | 0 | 0 | 0 | 0 | 0 | 0 | 0 | 50 | 50 |
| Fructose | 50 | 50 | 50 | 50 | 50 | 50 | 100 | 0 | 0 |
| Toluene | 170 | 170 | 170 | 170 | 170 | 344 | 344 | 0 | 0 |
| Ethylbenzene | 0 | 0 | 0 | 0 | 0 | 0 | 0 | 173 | 173 |
| Isobutane | 0 | 0 | 0 | 220 | 220 | 0 | 0 | 0 | 0 |
| Hydrogen Fluoride | 222 | 249 | 230 | 236 | 231 | 240 | 347 | 227 | 232 |
| Recovery, Grams: | | | | | | | | | |
| Pentane-Soluble | 24 | 70.6 | 75.5 | 37.2 | 42.5 | 83.4 | 114.0 | 1 | 36 |
| Benzene-Soluble (Pentane-Insoluble) | 60 | 575 | | 64.1 | | 42.3 | | 98 | 74 |
| Water-Soluble | 1 | <1 | | | | | | 2 | 4 |
| Toluene | | | 75.5 | | 81.4 | | 148.0 | | |
| Total Toluene-Free Organic | 85 | 128.1 | | 103.3 | | 125.7 | | 101 | 114 |

In Table X, run 54, the pentane-soluble portion of the reaction product crystallized on standing. After 2 recrystallizations from methanol, it melted at 90.5–92° C. Its infrared analysis showed a content of more than 90% triphenylmethane. Diphenylmethane was not found. Its elementary analysis and melting point data can be summarized as follows:

|  | Melting Point, degrees | Percent Carbon | Percent Hydrogen |
| --- | --- | --- | --- |
| Found for triphenylmethane | 90.5–92 | 93.07 | 6.81 |
| Pure triphenylmethane | 92 | 93.40 | 6.60 |

Runs 55 and 56, Table X, gives the results of the reaction of benzene and fructose. These results indicate that benzene reacts difficultly with fructose under the conditions outlined. When 75 grams of fructose was contacted for 70 hours with an excess of benzene in the presence of hydrogen fluoride (run 56), 13.2 grams of pentane-soluble was obtained. This pentane-soluble portion of the reaction product was distilled at reduced pressure and on infrared analysis of distillate cuts was shown to contain over 60% diphenylmethane. There was an indication that triphenylmethane was also present.

In Table X, runs 57, 58, and 59, were made using 50 grams of glucose, an excess of toluene, and under similar conditions except for increasing periods of reaction. The pentane-soluble portion of the reaction product increased with time as follows: 3 hours, 3 grams; 24 hours, 30 grams; and 66 hours, 45 grams. From run 60, the pentane-soluble portion of the reaction product was distilled at atmospheric pressure. The fraction boiling from 280–340° C. (5.9 grams) was redistilled under vacuum and di-p-tolylmethane identified therefrom. A substantially light yellow crystalline compound, melting point 220° C., and boiling near 400° C. at 760 mm. was also isolated. It contained 92.4% carbon and 7.0% hydrogen which is compatible with the theoretical carbon and hydrogen analysis of tri-p-tolylmethane which boils at about 400° C. An extensive plateau near 500° C. consisting of a red glass of molecular weight near 350 was also obtained.

The reaction of toluene with fructose to produce pentane-soluble material, Table XI, runs 61, 62, 63, 66, and 67, was thoroughly investigated. Although previous examples have indicated that the fructose-toluene reaction at 0° C. was markedly slower than the corresponding glucose reaction, in contrast, at 30° C., the pentane-soluble product appearance was markedly faster from fructose than from glucose. Also, the yield of the pentane-insoluble product tended to reach a constant amount at about 24–66 hours time. A vacuum distillation of the pentane-soluble product from these runs resulted in products similar to those from glucose and toluene. Di-p-tolylmethane was identified. Two pure compounds boiling near 400° C. were also isolated. One, light, yellow crystals, had a melting point of 230–231.5° and contained 92.80% carbon and 7.40% hydrogen. The other consisted of white crystals with a light purple fluorescence which had a melting point of 139–140° C. and an elementary analysis of 93.10% carbon and 7.0% hydrogen. The material boiling on a plateau near 500° C. was a red glass with a molecular weight around 350. On oxidation it yielded terephthalic acid.

Runs 64 and 65, Table XI, were carried out by reacting toluene and fructose in the presence of isobutane. The hydrocarbon part of the product appeared to correspond to that observed in the absence of isobutane except for the presence of tert-butyltoluene (a 2:1 mixture of meta to para), and another compound believed to be tert-butylated di-p-tolylmethane. This latter compound consisted of white crystals which melted at 80–81° C. and contained 91.1% carbon and 8.8% hydrogen.

The reaction of ethylbenzene with glucose, runs 68 and 69, Table XI, gave yields of pentane-soluble products similar to those yields obtained from toluene and glucose under similar conditions. Twenty-six percent of the pentane-soluble product (36 grams) from run 69, boiled in the range 300–335° C. Two separate plateaus were observed. From one plateau, di-p-ethylphenylmethane was isolated. Its oxidation product is 4,4'-dicarboxybenzophenone. Its boiling point, 320° C., its refractive index, elementary analysis (C, 91.04%; H, 9.29%), and molecular weight, 224.3 corresponding to the proper structural formula. Also, 1-p-ethylphenyl-1-phenylethane was isolated. Its oxidation product is p-benzoyl benzoic acid which was identified through its methyl ester. The boiling point 300–304° C. refractive index, elementary analysis (C, 91.33%; H, 8.88%), molecular weight, 210.3, and oxidation product are in accordance with the proper structural formula.

Part of the total pentane-soluble hydrocarbons from runs 66 and 62, Table XI, were combined and their effect on the viscosity index of lubricating oils evaluated. A SAE–40 lubricating oil with no additives had a specific gravity of 0.875 and a viscosity index of 88.5. With 1% of added pentane-soluble hydrocarbons, its viscosity index was reduced to 84.1, and with 3% of added pentane-soluble hydrocarbons, this viscosity index was reduced to 80.0.

EXAMPLE XVII

This example illustrates the reaction of toluene with alginic acid. Alginic acid is a polysaccharide composed of uronic acid units. This reaction was studied at 0° C. in three different experiments which involve the utilization of hydrogen fluoride as the catalyst. In two of the experiments, the contacting was for a period of two hours time, while in the third experiment a reaction time of 16 hours was utilized.

EXPERIMENT I

The following reactants were charged to an 1100 ml. turbomixer autoclave: 50 grams of alginic acid, 172 grams of toluene, and 226 grams of HF. The mixture was contacted for 2 hours at 0° C. and atmospheric pressure. At the end of the contact time, most of the hydrogen fluoride was flushed from the system by passing a stream of nitrogen through the autoclave. The product, which was transferred to a silver dish, weighed 129 grams after standing overnight in a hood-draft.

A portion of the product (30 grams) was washed twice with cold water and then heated to the boiling point of water with another portion of water. The hot water was decanted and on cooling yielded a syrupy white colored precipitate. A small portion of the syrupy white precipitate was oxidized and from the oxidation product was obtained 1,4-dicarboxybenzophenone which was identified by the melting point of its dimethyl ester. Another portion of the syrupy white precipitate was extracted with ether and on evaporation of the ether, a glossy residue remained. This residue was dissolved in hot acetone and on cooling, a fluffy white precipitate appeared crystalline under a microscope.

EXPERIMENT II

This experiment was conducted in a manner similar to Experiment I with 100 grams of alginic acid, 258 grams of toluene, and 413 grams of HF. These reactants were contacted for 2 hours at 0° C. 259 grams of product was obtained. After standing several days, the product weighed 185 grams, indicating that it still contained considerable hydrogen fluoride after the initial nitrogen purge. This product was dissolved in dilute sodium hydroxide solution. A portion of the caustic solution was acidified and a precipitate separated. The precipitate was dried by heating with benzene in an evaporating dish. The dry solid was washed with ether and the ether then evaporated. The resultant dry solid melted from 160–180° C. and could not be crystallized from alcohol or acetic acid. The remainder of the caustic solution was then acidified with hydrochloric acid. The syrupy material which separated was washed with water and dried in a desiccator. A dry powder having a neutralization equivalent of 280 was obtained.

A surface-active material was prepared by exactly neutralizing eight grams of the powdery material with sodium hydroxide. This solution was ether extracted and the water layer on evaporation yielded 4.1 grams of a highly surface-active material product.

EXPERIMENT III

In this experiment, 75 grams of alginic acid, 215 grams of toluene, and 342 grams of HF were contacted for 16 hours at 0° C. The product obtained, after standing for 3 days, weighed 160 grams. Approximately 140 grams of this product was dissolved in methanol and benzene, and the mixture evaporated over steam. On drying in a desiccator, the net weight of the resultant material was 101 grams. A small portion of this on oxidation yielded both terephthalic acid and 1,4-dicarboxybenzophenone. The product was not soluble in pentane. 20 grams of the product was treated with benzene and the insoluble portion filtered off. Clusters of crystals were observed under a microscope.

The benzene insoluble material was boiled with toluene and on cooling a crystalline precipitate appeared. This precipitate had a melting point of approximately 300° C. and after four recrystallizations from toluene it melted as follows: from 250° C. and higher, the material gradually turned brown in color; at 287–290° C., the precipitate melted and decomposed. This product on analysis was found to contain 77.50% carbon and 7.11% hydrogen.

I claim as my invention:

1. A process which comprises reacting a hydrocarbon with a carbohydrate selected from the group consisting of monosaccharides, their desoxy- and their omega-carboxy-derivatives, oligosaccharides, and polysaccharides in the presence of a catalytic amount of hydrogen fluoride at a temperature of from about −10° to about 100° C. to produce a compound selected from the group consisting of hydrocarbon substituted desoxy-alditols and hydrocarbon substituted desoxy-ketitols, and recovering said compound.

2. A process which comprises reacting an isoparaffinic hydrocarbon with a carbohydrate selected from the group consisting of monosaccharides, their desoxy- and their omega-carboxy-derivatives, oligosaccharides, and polysaccharides, in the presence of a catalytic amount of hydrogen fluoride at a temperature of from about −10° to about 100° C. to produce a compound selected from the group consisting of hydrocarbon substituted desoxy-alditols and hydrocarbon substituted desoxy-ketitols, and recovering said compound.

3. A process which comprises reacting an olefinic hydrocarbon with a carbohydrate selected from the group consisting of monosaccharides, their desoxy- and their omega-carboxy-derivatives, oligosaccharides, and polysaccharides in the presence of a catalytic amount of hydrogen fluoride at a temperature of from about −10° to about 100° C. to produce a compound selected from the group consisting of hydrocarbon substituted desoxy-alditols and hydrocarbon substituted desoxy-ketitols, and recovering said compound.

4. A process which comprises reacting an aromatic hydrocarbon with a carbohydrate selected from the group consisting of monosaccharides, their desoxy- and their omega-carboxy-derivatives, oligosaccharides, and polysaccharides in the presence of a catalytic amount of hydrogen fluoride at a temperature of from about −10° to about 100° C. to produce a compound selected from the group consisting of hydrocarbon substituted desoxy-alditols and hydrocarbon substituted desoxy-ketitols, and recovering said compound.

5. A process which comprises reacting a naphthenic hydrocarbon with a carbohydrate selected from the group consisting of monosaccharides, their desoxy- and their omega-carboxy-derivatives, oligosaccharides, and polysaccharides, in the presence of a catalytic amount of hydrogen fluoride at a temperature of from about −10° to about 100° C. to produce a compound selected from the group consisting of hydrocarbon substituted desoxy-alditols and hydrocarbon substituted desoxy-ketitols, and recovering said compound.

6. A process which comprises reacting toluene with cellulose in the presence of a catalytic amount of hydrogen fluoride at a temperature of from about 0° to about 100° C. to produce a p-tolyl-1-desoxy-glucitol, and recovering the last-named compound.

7. A process which comprises reacting toluene with glucose in the presence of a catalytic amount of hydrogen fluoride at a temperature of from about −10° to about 100° C. to produce a p-tolyl-1-desoxy-glucitol, and recovering the last-named compound.

8. A process which comprises reacting toluene with fructose in the presence of a catalytic amount of hydrogen fluoride at a temperature of from about −10° to about 100° C. to produce a p-tolyl-2-desoxy-fructitol, and recovering the last-named compound.

9. A process which comprises reacting toluene with sorbose in the presence of a catalytic amount of hydrogen fluoride at a temperature of from about −10° to about 100° C. to produce a p-tolyl-2-desoxy-sorbitol, and recovering the last-named compound.

10. A process which comprises reacting toluene with sucrose in the presence of a catalytic amount of hydrogen fluoride at a temperature of from about −10° to about 100° C. to produce a p-tolyl-1-desoxy-glucitol and a p-tolyl-2-desoxy-fructitol, and recovering the resultant reaction products.

11. A process which comprises reacting an aromatic hydrocarbon with a monosaccharide in the presence of a catalytic amount of hydrogen fluoride at a temperature of from about −10° to about 100° C. to produce a compound selected from the group consisting of a hydrocarbon substituted desoxy-alditol and a hydrocarbon substituted desoxy-ketitol, and recovering said compound.

12. A process which comprises reacting an aromatic hydrocarbon with a disaccharide in the presence of a catalytic amount of hydrogen fluoride at a temperature of from about −10° to about 100° C. to produce a compound selected from the group consisting of a hydrocarbon substituted desoxy-alditol and a hydrocarbon substituted desoxy-ketitol, and recovering said compound.

13. A process which comprises reacting an aromatic hydrocarbon with a polysaccharide in the presence of a catalytic amount of hydrogen fluoride at a temperature of from about −10° to about 100° C. to produce a compound selected from the group consisting of a hydrocarbon substituted desoxy-alditol and a hydrocarbon substituted desoxy-ketitol, and recovering said compound.

References Cited in the file of this patent

UNITED STATES PATENTS

| | | |
|---|---|---|
| 2,252,725 | Niederl | Aug. 19, 1941 |
| 2,379,368 | Matuszak | June 26, 1945 |
| 2,400,520 | Kuhn | May 21, 1946 |
| 2,404,340 | Zimmerman | July 16, 1946 |
| 2,460,803 | Bonner et al. | Feb. 8, 1949 |
| 2,472,276 | Bonner et al. | June 7, 1949 |

FOREIGN PATENTS

Simons: Ind. and Eng. Chem., vol. 32, pp. 178–183, 6 pp. (February 1940).

Thomas: "Anhydrous Aluminum Chloride in Organic Chemistry," p. 643 (1 p.), publ. by Reinhold Pub. Corp., New York (1941).